(12) United States Patent
Tsurusaki

(10) Patent No.: US 9,170,652 B2
(45) Date of Patent: Oct. 27, 2015

(54) ELECTRONIC DEVICE AND PORTABLE TERMINAL PROVIDED WITH SAME

(75) Inventor: Kouji Tsurusaki, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 122 days.

(21) Appl. No.: 13/881,248

(22) PCT Filed: Oct. 26, 2011

(86) PCT No.: PCT/JP2011/074692
§ 371 (c)(1),
(2), (4) Date: Apr. 24, 2013

(87) PCT Pub. No.: WO2012/063645
PCT Pub. Date: May 18, 2012

(65) Prior Publication Data
US 2013/0222319 A1      Aug. 29, 2013

(30) Foreign Application Priority Data

Nov. 12, 2010   (JP) .................................. 2010-253906

(51) Int. Cl.
*G06F 3/01* (2006.01)
*G06F 1/16* (2006.01)

(52) U.S. Cl.
CPC .............. *G06F 3/016* (2013.01); *G06F 1/1626* (2013.01); *G06F 1/1656* (2013.01)

(58) Field of Classification Search
None
See application file for complete search history.

(56) References Cited

U.S. PATENT DOCUMENTS

| | | | |
|---|---|---|---|
| 8,179,027 B2 | 5/2012 | Strittmatter et al. | |
| 8,384,679 B2 | 2/2013 | Paleczny et al. | |
| 8,384,680 B2 | 2/2013 | Paleczny et al. | |
| 8,427,441 B2 | 4/2013 | Paleczny et al. | |
| 2004/0061688 A1 | 4/2004 | Nakayama et al. | |
| 2006/0192657 A1 | 8/2006 | Nishimura et al. | |
| 2009/0243817 A1* | 10/2009 | Son ............................ | 340/407.2 |
| 2010/0156814 A1 | 6/2010 | Weber et al. | |

(Continued)

FOREIGN PATENT DOCUMENTS

| | | |
|---|---|---|
| CN | 1821935 A | 8/2006 |
| CN | 101763166 A | 6/2010 |

(Continued)

OTHER PUBLICATIONS

Japanese Office Action with Statement of Relevance of non-English references, Japanese Patent Appln. No. 2012-542864, Jul. 1, 2014.
Chinese Office Action with English concise explanation, Chinese Patent Application No. 201180050548.1, May 11, 2015, 9 pgs.
International Search Report, PCT/JP2011/074692, 1pp., Jan. 10, 2012.

*Primary Examiner* — Nicholas Lee
*Assistant Examiner* — Duane N Taylor, Jr.
(74) *Attorney, Agent, or Firm* — Volpe and Koenig, P.C.

(57) ABSTRACT

According to one aspect of the present invention, an electronic device includes a detecting unit, a first housing, an operation unit, a vibrating body, and a flexible portion. The detecting unit detects an input position. The first housing includes a base disposed opposite the detecting unit and a frame body positioned on the base so as to surround the detecting unit in plan view. The operation unit is positioned at a front surface side of the detecting unit so as to cover the detecting unit in plan view. The vibrating body is provided to the operation unit. The flexible portion is provided over a whole circumference of the frame body and supporting the operation unit.

12 Claims, 10 Drawing Sheets

(56) References Cited

U.S. PATENT DOCUMENTS

| | | |
|---|---|---|
| 2010/0156844 A1 | 6/2010 | Paleczny et al. |
| 2010/0253485 A1 | 10/2010 | Park et al. |
| 2011/0095975 A1* | 4/2011 | Hwang et al. ............... 345/156 |
| 2011/0304569 A1 | 12/2011 | Kai et al. |

FOREIGN PATENT DOCUMENTS

| | | |
|---|---|---|
| JP | 2004118754 A | 4/2004 |
| JP | 2004-334740 A | 11/2004 |
| JP | 2010152888 A | 7/2010 |
| WO | 2010073509 A1 | 7/2010 |

\* cited by examiner

ELECTRONIC DEVICE AND PORTABLE TERMINAL PROVIDED WITH SAME

FIELD OF INVENTION

The present invention relates to an electronic device and a portable terminal provided with the same.

BACKGROUND

In recent years, there is a known tactile transmission technique to transmit various tactile senses, such as a sense of pressing, a sense of tracing, or a sense of texture, to a user when the user operates a touch panel (for example, see Patent Literature 1).

An electronic equipment to which such a tactile transmission technique is applied includes a vibrating body provided on a touch panel. The electronic equipment can transmit various tactile senses to the user by causing flexural vibration of the touch panel in the vertical direction according to expansion and contraction motions of the vibrating body. The electronic equipment to which such a tactile transmission technique is applied is mainly provided in a portable terminal; therefore, dust-proofing and water-proofing are necessary.

PATENT LITERATURE 1: Japanese Patent Application Laid-open No. 2004-118754

SUMMARY

The present invention relates to an electronic device capable of adequately transmitting tactile senses to a user while ensuring certain dustproof performance and waterproof performance, and a portable terminal provided with the same.

An electronic device according to one aspect of the present invention comprises: a detecting unit that detects an input position; a first housing including a base disposed opposite the detecting unit and a frame body positioned on the base so as to surround the detecting unit in plan view; an operation unit positioned at a front surface side of the detecting unit so as to cover the detecting unit in plan view; a vibrating body provided to the operation unit; and a flexible portion provided over a whole circumference of the frame body and supporting the operation unit.

A portable terminal according to another aspect of the present invention comprises the electronic device according to the present invention in a second housing.

DETAILED DESCRIPTION OF THE PREFERRED EMBODIMENT(S)

Figure 1:
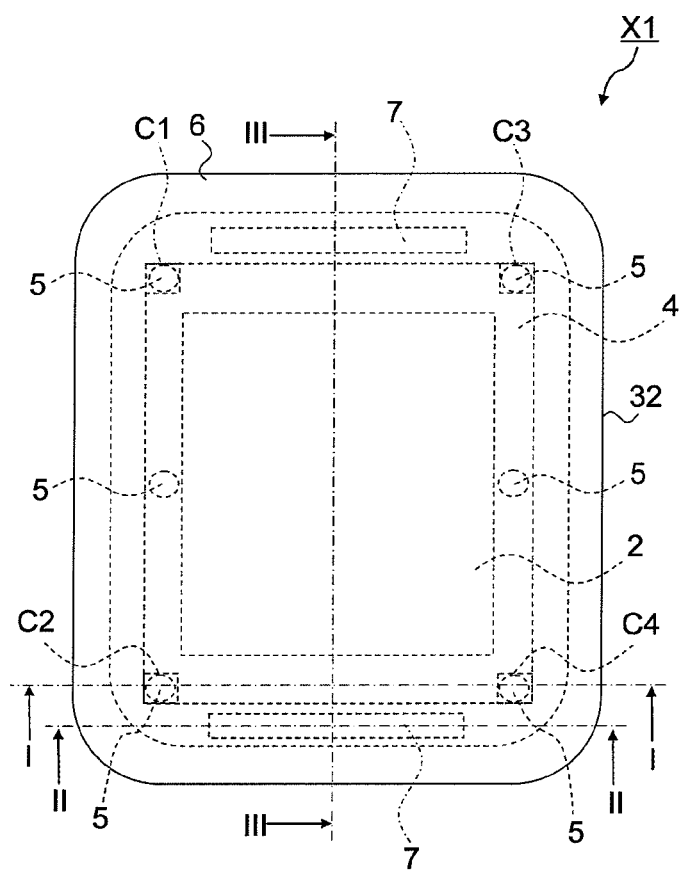
FIG. 1 is a plan view illustrating an overall configuration of an electronic device according to a first embodiment of the present invention.

Hereinafter, embodiments of the present invention will be described with reference to the drawings. Note that in the drawings to be referred to hereinafter, primary members necessary to describe the present invention, among components according to an embodiment of the present invention, are illustrated in a simplified manner, for convenience of explanation. Accordingly, an electronic device according to the present invention and a portable terminal provided therewith may include other components that are not illustrated in the drawings to be referred to herein.

First Embodiment

As illustrated in FIGS. 1 to 5, an electronic device X1 according to this embodiment includes a liquid crystal panel 2, a first housing 3, a touch panel 4, a supporting body 5, an operation unit 6, a vibrating body 7, and a flexible portion 8.

The liquid crystal panel 2 is a display panel using a liquid crystal composition for display. Specifically, the liquid crystal panel 2 includes one substrate; the other substrate disposed opposite the one substrate; a liquid crystal layer interposed between the one substrate and the other substrate; a display member layer that is interposed between the one substrate and the other substrate and that contributes to displaying; and a backlight that irradiates the one substrate and the other substrate with light. Herein, for convenience of explanation, illustration of the one substrate, the other substrate, the liquid crystal layer, the display member layer, and the backlight is omitted. Examples of the display member layer include a pixel electrode, an alignment film, and a color filter. As a drive system of the liquid crystal panel 2, a simple matrix drive system or an active matrix drive system may be employed.

A display panel, such as a plasma panel, an organic EL panel, or electronic paper, may be used instead of the liquid crystal panel 2. The organic EL panel is a display panel incorporating a substance that emits light upon application of a voltage. Specifically, the organic EL panel is formed by depositing a luminous body using an organic substance, such as diamine, onto a substrate and performs display upon application of a direct-current (DC) voltage of 5V to 10V. In the case of using the organic EL panel instead of the liquid crystal panel 2, the backlight is not needed.

The first housing 3 includes a base 31 and a frame body 32. The base 31 has a principal surface 51a. The liquid crystal panel 2 is provided on a principal surface 31a of the base 31. The frame body 32 is provided on the principal surface 31a of the base 31 so as to surround the liquid crystal panel 2. Examples of a material of the base 31 and the frame body 32 include: resin such as polycarbonate; and metal such as stainless, aluminum, or magnesium alloy. The base 31 and the frame body 32 may be integrally formed or may be separately formed.

Figure 2:
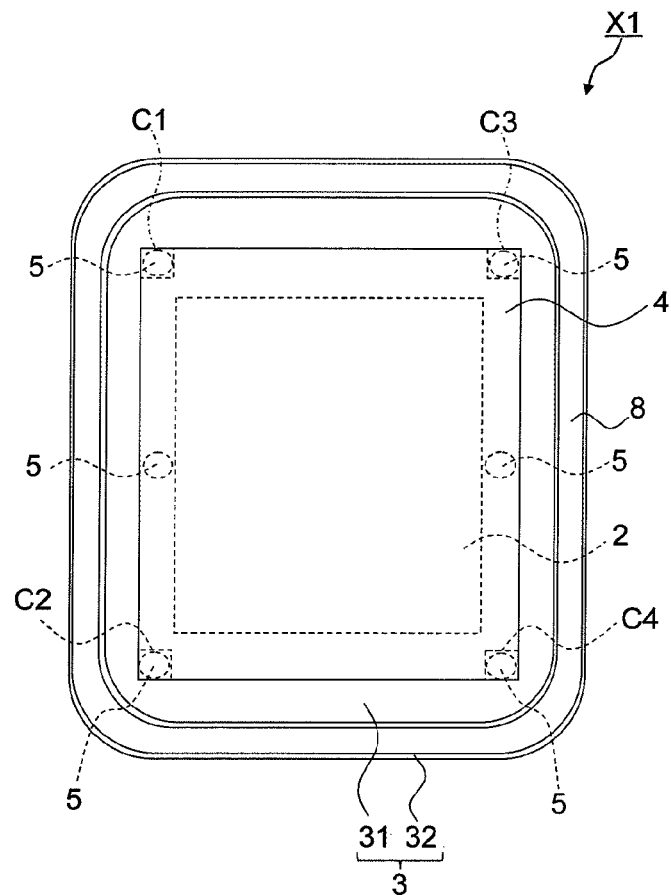
FIG. 2 is a plan view illustrating an overall configuration of the electronic device illustrated in FIG. 1, when the electronic device is viewed from above while an operation unit is omitted.
Figure 3:
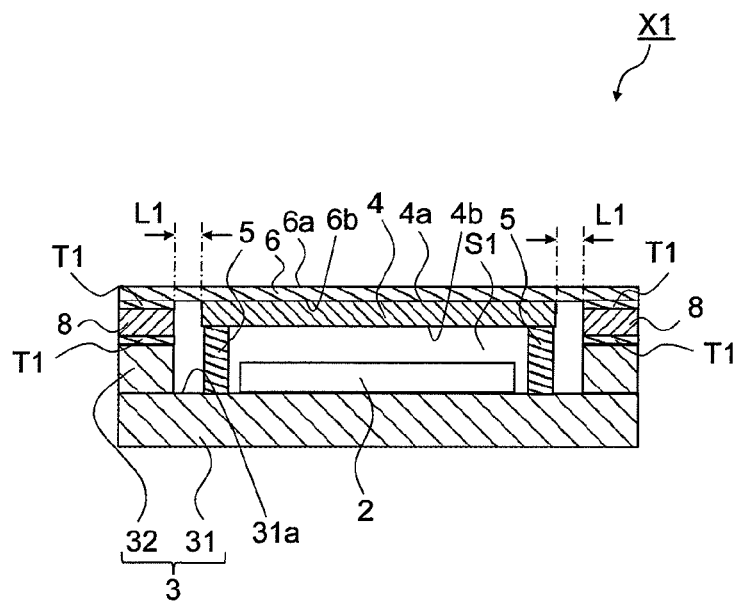
FIG. 3 is a cross-sectional view taken along a cutting-plane line I-I illustrated in FIG. 1.
Figure 4:
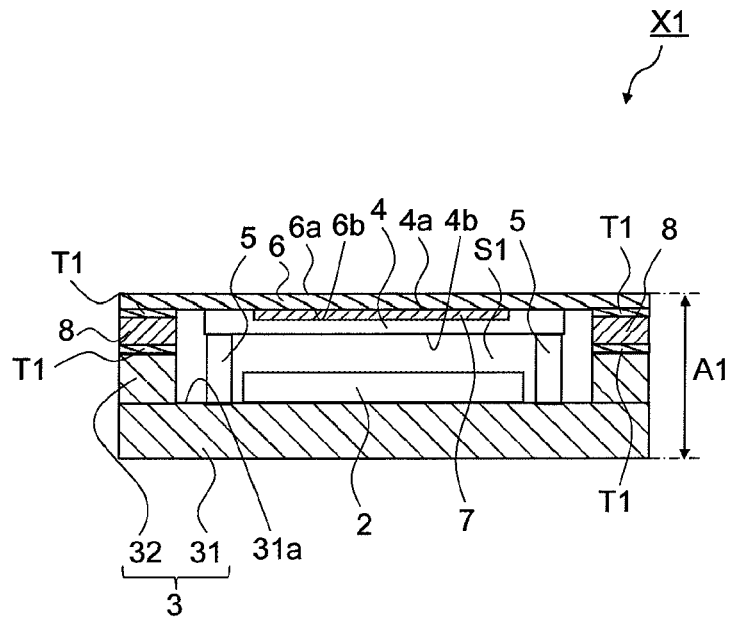
FIG. 4 is a cross-sectional view taken along a cutting-plane line II-II illustrated in FIG. 1.
Figure 5:
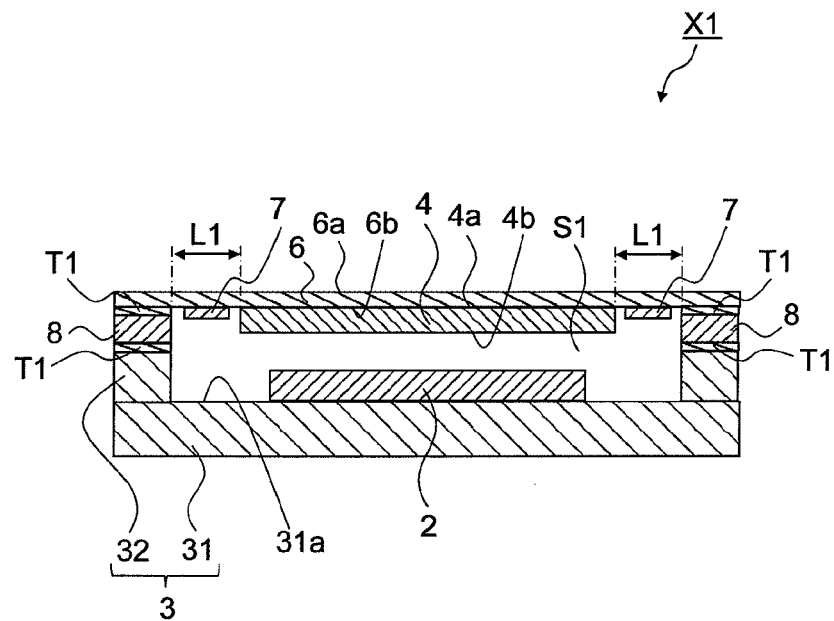
FIG. 5 is a cross-sectional view taken along a cutting-plane line III-III illustrated in FIG. 1.

The touch panel 4 has a front surface 4a and a back surface 4b, and serves as a detecting unit that detects a location where a user operates with a finger, a pen, or the like, as an input position. As illustrated in FIGS. 3 to 5, the touch panel 4 is disposed opposite the liquid crystal panel 2 with a space S1 interposed therebetween. As illustrated in FIG. 1 and FIG. 2, the touch panel 4 has a rectangular shape in plan view. In this specification, even when the outer circumferences of four corners C1 to C4 of the touch panel 4 have circular shapes in plan view, the touch panel 4 is described as having a rectangular shape in plan view. That is to say, it is sufficient that the touch panel 4 has a substantially rectangular shape in plan view. In this specification, "substantially" means the same as "approximately". In the first embodiment, a capacitive touch panel is used as the touch panel 4 in terms of improvement in the detection sensitivity. However, a resistive touch panel, a surface acoustic wave touch panel, an infrared touch panel, an electromagnetic induction type touch panel, or the like may be used instead of the capacitive touch panel.

The supporting body 5 is a member that serves to support the touch panel 4. The supporting body 5 is provided on the principal surface 31a of the base 31. In the first embodiment, a plurality of supporting bodies 5 are located at six positions in total, i.e., at the four corners C1 to C4 of the touch panel 4, at a location between the corners C1 and C2, and at a location between the corners C3 and C4. The supporting body 5 has a cylindrical shape for example. However, the supporting body 5 may have a rectangular columnar shape. Examples of a material of the supporting body 5 include silicone rubber, urethane rubber, urethane foam, and other rubbers.

The operation unit 6 includes a front surface 6a and a back surface 6b. The operation unit 6 is a member that serves to allow a user to perform an input operation with a finger, a pen, or the like. That is, the front surface 6a of the operation unit 6 is directly operated by the user with a finger, a pen or the like. In a planar view, the operation unit 6 is located at the front surface 4a of the touch panel 4 to cover the touch panel 4. In this embodiment, the operation unit 6 is adhered to the front surface 4a of the touch panel 4 via OCA (Optical Clear Adhesive). Here, the operation unit 6 may be separated from the front surface 4a of the touch panel 4. Also, the operation unit 6 has translucency. Also, in this specification, the translucency means visible light permeability. Examples of composition materials of the operation unit 6 may include synthetic resin such as polyethylene terephthalate, glass, plastic, and the like. The operation unit 6 may have a film-like shape formed of these materials, or may be formed to have a small thickness.

The vibrating body 7 is a member that serves to cause flexural vibration of the operation unit 6 upon detection of a predetermined input operation by a user. Specifically, the vibrating body 7 repeats expansion and contraction motions in a short-side direction of the operation unit 6 (a right and left direction in FIG. 1 when the drawing is viewed from above), thereby causing flexural vibration of the operation unit 6 in the thickness direction of the operation unit 6 (hereinafter, this direction will be referred to as a "vertical direction"). Also, as will be described below in detail, the vibrating body 7 detects a pressing load on the operation unit 6. The vibrating body 7 is provided on the back surface 6b of the operation unit 6 with an adhesive member (not illustrated). In this embodiment, the vibrating body 7 is, for example, a piezoelectric element that performs expansion and contraction motions based on an applied voltage; however, it is not limited thereto. An electromagnetic vibrating body, a spring, a motor, or the like may be used instead of the piezoelectric element.

In this embodiment, since the vibrating body 7 is a piezoelectric element, the vibrating body 7 has the following configuration. That is, the vibrating body 7 includes an electrode and an active layer that are alternately stacked, and an inert layer is provided at a portion located near the back surface 6b of the operation unit 6. Herein, the inert layer includes a polarized piezoelectric material. Also, the inert layer includes an unpolarized piezoelectric material, a metal material, and an insulating material.

In the first embodiment, as illustrated in FIG. 1 and FIG. 2, the vibrating body 7 is formed of two vibrating bodies that are respectively provided in the vicinity of both short sides of the operation unit 6, along the short sides. However, the layout position, the number, and the like of the vibrating body 7 are not particularly limited. For example, the vibrating body 7 may be formed of two vibrating bodies that are respectively provided in the vicinity of both long sides of the operation unit 6 along the long sides, or may be formed of four vibrating bodies that are respectively provided in the vicinity of all of the long sides and the short sides of the operation unit 6 along the long sides and the short sides.

The flexible portion 8 has a function to be deflected according to flexural vibration of the operation unit 6. Therefore, the flexible portion 8 has elasticity. Examples of a material of the flexible portion 8 include urethane rubber, urethane resin, urethane foam, silicone rubber, polyester.

The flexible portion 8 supports the operation unit 6. Also, as illustrated in FIG. 2, the flexible portion 8 is provided over the whole circumference of the frame body 32. Specifically, the flexible portion 8 is located between the operation unit 6 and the frame body 32, and is bonded to the operation unit 6 and the frame body 32 with a double-stick tape T1. The space S1 is sealed with the base 31, the frame body 32, the operation unit 6 and the flexible portion 8. Therefore, the electronic device X1 can ensure certain dustproofing and waterproofing for the liquid crystal panel 2. To ensure more waterproof performance, it is preferable to use a waterproof double-stick tape as the double-stick tape T1.

Figure 6:
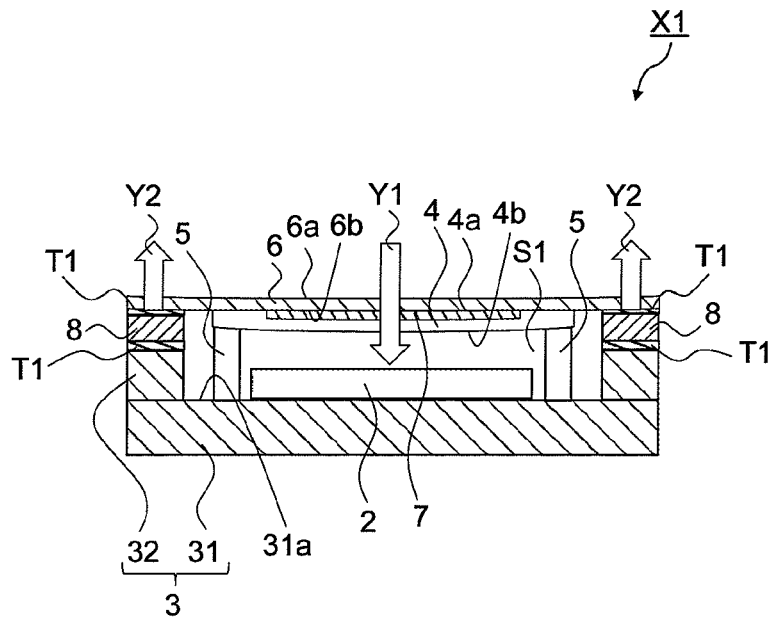
FIG. 6 is a diagram illustrating a state in which the operation unit and a touch panel are curved downward and a flexible portion is deflected upward.
Figure 7:
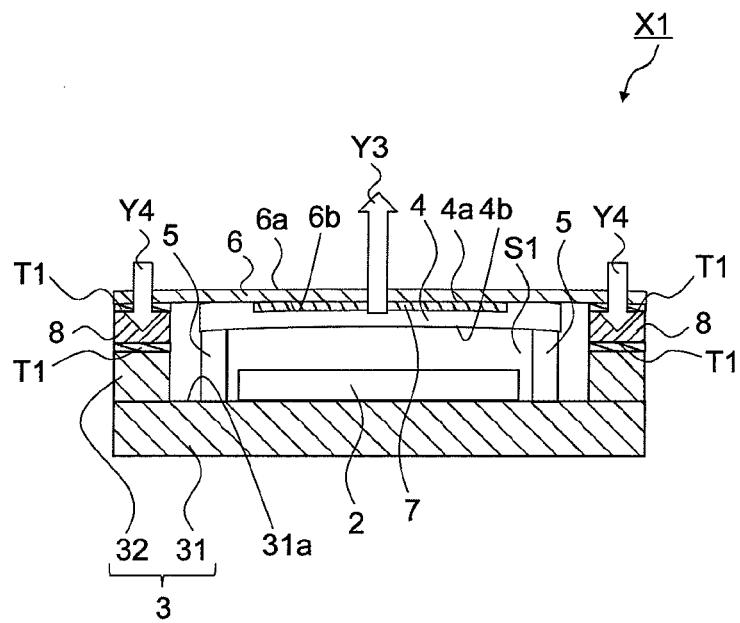
FIG. 7 is a diagram illustrating a state in which the operation unit and the touch panel are curved upward and the flexible portion is deflected downward.

Herein, an operation of the flexible portion 8 will be described. When the vibrating body 7 contracts upon application of a voltage to the vibrating body 7, the operation unit 6 and the touch panel 4 are curved downward with the supporting bodies 5 serving as supporting points, as indicated by an arrow Y1 in FIG. 6. According to the downward curvature of the operation unit 6 and the touch panel 4, the flexible portion 8 is deflected upward as represented by an arrow Y2 of FIG. 6. On the other hand, when the contraction of the vibrating body 7 is released and the vibrating body 7 expands in the short-side direction of the operation unit 6, the operation unit 6 and the touch panel 4 are curved upward at the supporting body 5 serving as supporting points, as indicated by an arrow Y3 of FIG. 7. Along with the upward curvature of the operation unit 6 and the touch panel 4, the flexible portion 8 is deflected downward as represented by an arrow Y4 of FIG. 7.

In this way, the flexure vibration of the operation unit 6 and the touch panel 4 with the supporting bodies 5 serving as supporting points occurs in the vertical direction. Along with the flexure vibration, the flexible portion 8 is deflected in the vertical direction. By providing the flexible portion 8 in the electronic device X1, it is possible to reduce the possibility that the flexure vibration of the operation unit 6 and the touch panel 4 may be suppressed. Therefore, the electronic device X1 can adequately transmit tactile sensation to a user.

Also, in this embodiment, since the vibrating body 7 is provided to the back surface 6b of the operation unit 6, even when an amount of the expansion and contraction motion of the vibrating body 7 is somewhat small, a sufficient tactile sensation can be transmitted to the user, as compared to the case when the vibrating body 7 is provided to the back surface 4b of the touch panel 4. In other words, even when the value of a voltage applied to the vibrating body 7 is somewhat small, a sufficient tactile sensation can be transmitted to the user. This is because the vibrating body 7 is directly provided to the operation unit 6 that is directly operated by the user. Also, since the vibrating body 7 is provided to the back surface 6b of the operation unit 6, a thickness A1 (see FIG. 4) of the electronic device X1 can be reduced by the thickness of the vibrating body 7, as compared to the case when the vibrating body 7 is provided at the back surface 4b of the touch panel 4.

Also, as illustrated in FIGS. 3 and 5, it is preferable to provide a gap L1 between the touch panel 4 and the flexible portion 8. Specifically, the gap L1 is a portion of the operation unit 6 that is not supported by the touch panel 4 and the flexible portion 8. In this embodiment, the vibrating body 7 is positioned to the gap L1. If the gap L1 is provided, the operation unit 6 can easily flexure vibrates in upward and downward direction by the expansion and contraction motion of the vibrating body 7. Herein, the gap L1 is dependent on the thickness of the operation unit 6, but may be in the range of 0.1 mm to 10 mm.

Operations of the electronic equipment X1 will be explained below with reference to FIG. 8.

In the following, an operation example of the electronic equipment X1 will be explained in which a sense of pressing is transmitted to a user as tactile transmission. However, the electronic equipment X1 is applicable to a case where various tactile senses, such as a sense of tracing or a sense of texture, in addition to the sense of pressing are transmitted.

Figure 8:
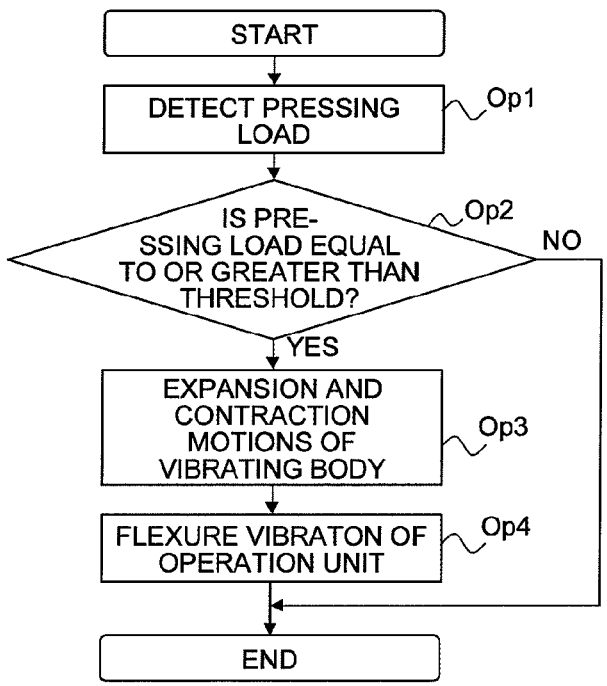
FIG. 8 is a flowchart illustrating an operation example of the electronic device.

As illustrated in FIG. 8, when a user presses the touch panel 4 via the operation unit 6, the vibrating body 7 detects a pressing load on the operation unit 6 (Op1). A load detection function of the vibrating body 7 will be explained below. Specifically, when a user presses the touch panel 4 via the operation unit 6, the operation unit 6 curves downward. When the operation unit 6 curves downward, the vibrating body 7 also curves downward. In other words, the amount of curvature of the vibrating body 7 varies depending on a pressing load on the operation unit 6. In the first embodiment, because the vibrating body 7 is a piezoelectric element, the vibrating body 7 can perform conversion to a voltage according to the amount of curvature. Therefore, the vibrating body 7 can detect the pressing load on the operation unit 6. An example has been explained above in which the load detection function is implemented by the vibrating body 7; however, the present invention is not limited thereto. For example, a load sensor, such as a distortion sensor, may be used to implement the load detection function.

When the input operation by the user is a pressing operation on an input object displayed on a display screen, a tactile transmission driver not illustrated determines whether the pressing load detected in Op1 is equal to or greater than a threshold (Op2). Here, the tactile transmission driver is provided on, for example, an FPC (Flexible Printed Circuit) connected to the touch panel 4, together with a touch panel driver that controls the touch panel 4.

If it is determined that the pressing load detected in Op1 is equal to or greater than the threshold (YES in Op2), the tactile transmission driver causes the vibrating body 7 to make expansion and contraction motions in the short-side direction of the operation unit 6 (Op3). The vibrating body 7 that has been caused to make expansion and contraction motions in Op3 causes flexural vibration of the operation unit 6 and the touch panel 4 in the vertical direction (Op4). Therefore, a sense of pressing is transmitted to the user who has pressed the touch panel 4 via the operation unit 6. On the other hand, if it is determined that the pressing load detected in Op1 is smaller than the threshold (NO in Op2), the tactile transmission driver ends the processing illustrated in FIG. 8.

As described above, the electronic device X1 can adequately transmit a tactile senses to a user while ensuring certain dustproof performance and water proof performance.

Second Embodiment

Figure 9:
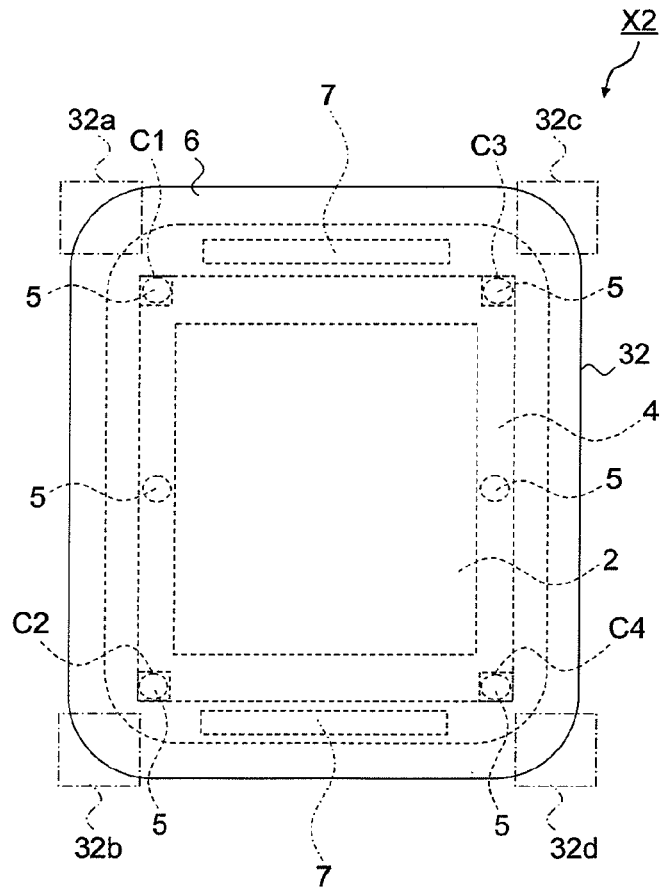
FIG. 9 is a plan view illustrating an overall configuration of an electronic device according to a second embodiment of the present invention.
Figure 10:
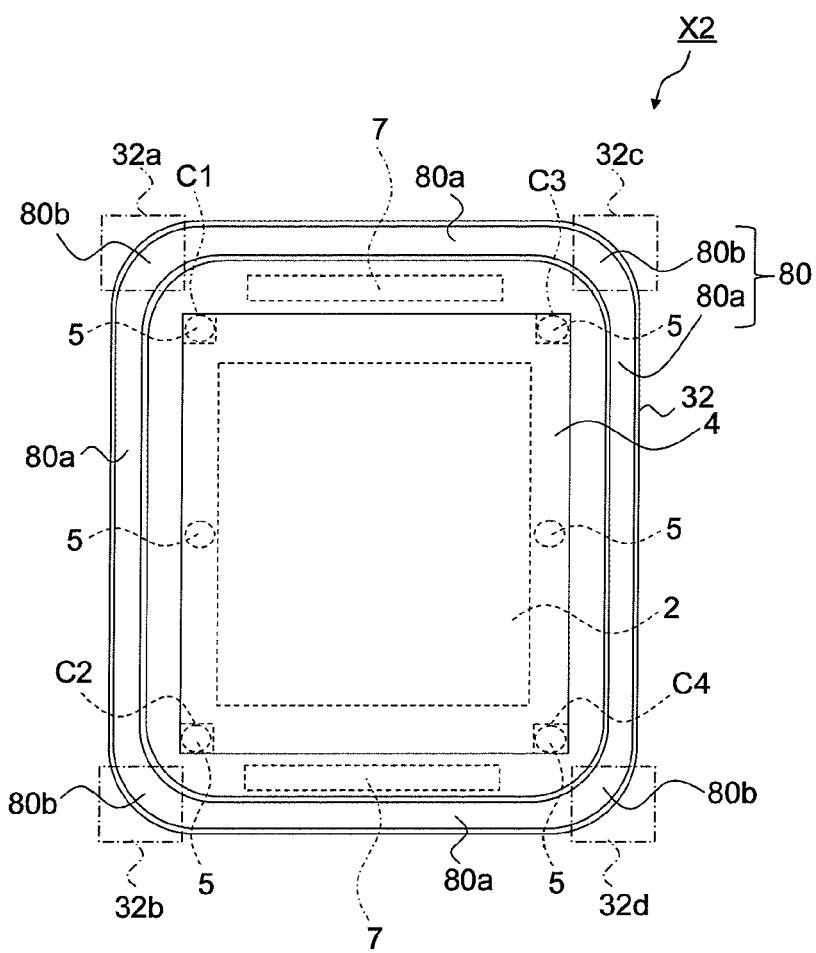
FIG. 10 is a plan view illustrating an overall configuration of the electronic device illustrated in FIG. 9, when the electronic device is viewed from above while the operation unit is omitted.

FIG. 9 is a plan view illustrating an overall configuration of an electronic equipment X2 according to the present embodiment. FIG. 10 is a plan view illustrating an overall configuration of the electronic equipment X2 illustrated in FIG. 9, when the electronic equipment X2 is viewed from above while the operation unit 6 is omitted. In FIG. 9 and FIG. 10, components having the same functions as those illustrated in FIG. 1 and FIG. 2 are denoted by the same reference numerals, and the detailed explanation thereof will be omitted.

In the electronic equipment X2, the frame body 32 has four corners 32a to 32d. The electronic equipment X2 includes a flexible portion 80 instead of the flexible portion 8 explained in the first embodiment. The flexible portion 80 includes a first part 80a and second parts 80b. The second parts 80b are respectively located at the four corners 32a to 32d of the frame body 32 and the degree of flexure thereof is lower than the degree of flexure of the first part 80a. In the second embodiment, the degree of flexure of the first part 80a is set between 10% and 90%, the degree of flexure of the second parts 80b is set between 0% and 70%, and the degree of flexure of the second parts 80b is set to be lower than the first part 80a. In other words, the second parts 80b are harder than the first part 80a. The "flexure" means deformation of a material. The "degree of flexure" means a rate of deformation of the material.

The first part 80a is located on the outer circumferential portion of the frame body 32 except for the four corners 32a to 32d. The second parts 80b are respectively located at the four corners 32a to 32d of the frame body 32. The second parts 80b are made of a material different from a material of the first part 80a so that the degree of flexure of the second parts 80b becomes lower than the degree of flexure of the first part 80a. For example, the first part 80a is made of silicon rubber, urethane rubber, urethane resin, or polyester, and the second parts 80b are made of silicon rubber, urethane rubber, or polyester.

It may be possible to form the first part 80a and the second parts 80b in different shapes so that the degree of flexure of the second parts 80b can become lower than the degree of flexure of the first part 80a. For example, the first part 80a may be formed in an M-shape in sectional view and the second parts 80b may be formed in rectangular shapes in sectional view. If the first part 80a is formed in an M-shape in sectional view, the first part 80a expands and contracts in accordance with the flexure vibration of the operation unit 6, and the expanding and contracting force enables a biasing force to be applied for the flexure vibration of the operation unit 6, which is preferable. This is because when the first part 80a is contracted, because the first part 80a is formed in the M-shape, a repulsive force against the contraction becomes greater compared with other shapes. The first part 80a may be formed in a bracket shape in sectional view or in a shape with a hollow.

As described above, according to the second embodiment, the first part 80a is located on the outer circumferential portion of the frame body 32 except for the four corners 32a to 32d, and the second parts 80b whose degree of flexure is lower than the degree of flexure of the first part 80a are respectively located at the four corners 32a to 32d of the frame body 32. Therefore, when causing the flexural vibration of the operation unit 6 in the vertical direction by expansion and contraction motions of the vibrating body 7, it is possible to cause adequate flexural vibration of the operation unit 6 in the vertical direction at the second parts 80b, as supporting points, located at the four corners 32a to 32d of the frame body 32. Therefore, the electronic equipment X2 can more adequately transmit tactile senses to a user compared with the electronic equipment X1.

As described above, the electronic equipment X2 can adequately transmit tactile senses to a user while ensuring certain dustproof performance and waterproof performance.

In the second embodiment, because the flexible portion 80 includes the first part 80a and the second parts 80b, which are respectively located at the four corners 32a to 32d of the frame body 32 and the degree of flexure of which is lower than the degree of flexure of the first part 80a, the supporting body 5 do not necessarily have to be provided.

Furthermore, in the second embodiment, an example has been explained in which the second parts 80b are respectively located at the four corners 32a to 32d of the frame body 32; however the present invention is not limited thereto. The second parts 80b may be provided between the corners 32a and 32b and between the corners 32c and 32d, in addition to the positions of the four corners 32a to 32d of the frame body.

Third Embodiment

Figure 11:
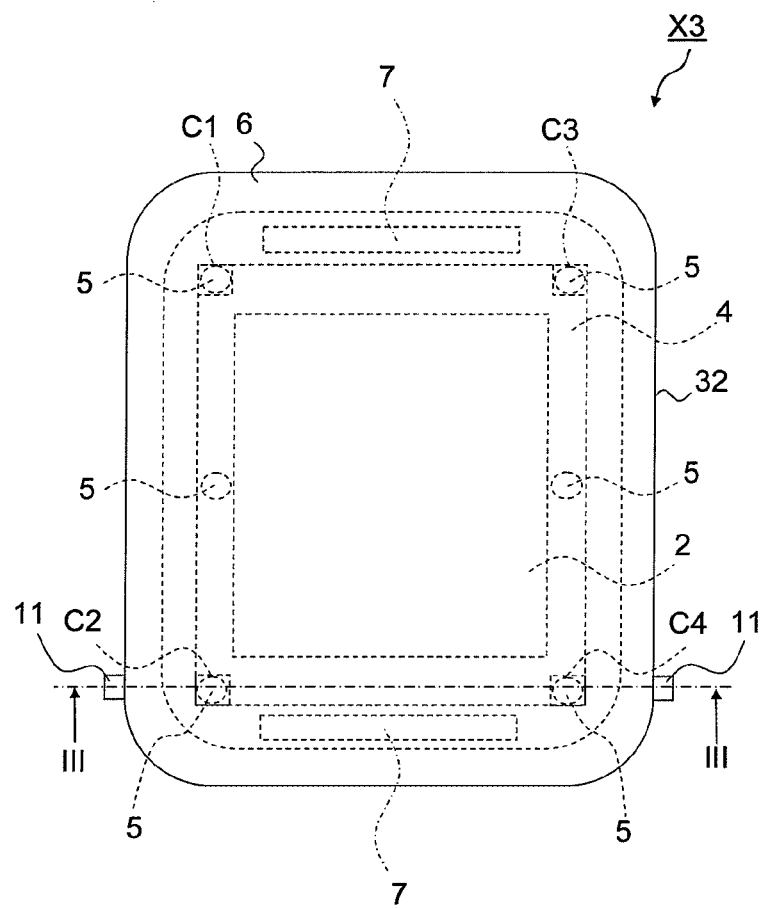
FIG. 11 is a plan view illustrating an overall configuration of an electronic device according to a third embodiment of the present invention.
Figure 12:
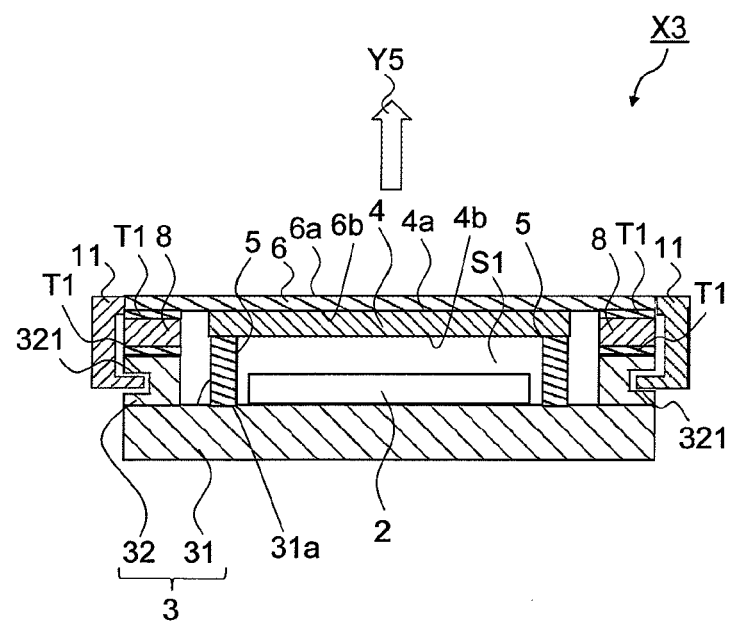
FIG. 12 is a cross-sectional view taken along a cutting-plane line III-III illustrated in FIG. 11.

FIG. 11 is a plan view illustrating an overall configuration of an electronic equipment X3 according to a third embodiment. FIG. 12 is a cross-sectional view taken along a cutting-plane line III-III illustrated in FIG. 11. In FIG. 11 and FIG. 12, components having the same functions as those illustrated in FIG. 1 and FIG. 3 are denoted by the same reference numerals, and the detailed explanation thereof will be omitted.

In the electronic equipment X3, the frame body 32 includes a groove 321. The electronic equipment X3 also includes a stopper 11 that prevents the operation unit 6 from being detached from the frame body 32. The stopper 11 is inserted into the groove 321 of the frame body 32. Examples of a material of the stopper 11 include the same material as the first housing 3. A case will be explained below that an external force is applied to the electronic equipment X3 when, for example, the electronic equipment X3 drops down. In this case, the double-stick tape T1 provided between the operation unit 6 and the flexible portion 8 or the double-stick tape T1 provided between the flexible portion 8 and the frame body 32 may be removed. If the double-stick tape T1 is removed, the operation unit 6 may be detached from the frame body 32. However, in the third embodiment, even when a force is applied in a direction indicated by an arrow Y5 in FIG. 12, the stopper 11 comes in contact with the inner wall surface of the groove 321 of the frame body 32. Because the stopper 11 comes in contact with the inner wall surface of the groove 321 of the frame body 32, the electronic equipment X3 can prevent the operation unit 6 from being detached from the frame body 32.

As described above, the electronic equipment X3 can adequately transmit tactile senses to a user while ensuring certain dustproof performance and waterproof performance. Furthermore, the electronic equipment X3 can improve the reliability.

Fourth Embodiment

Figure 13:
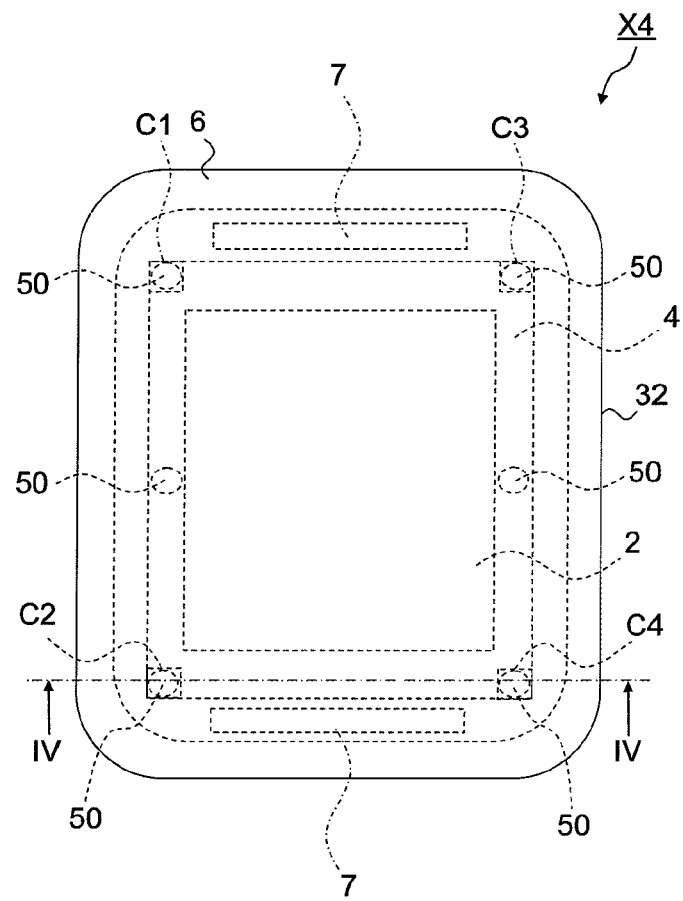
FIG. 13 is a plan view illustrating an overall configuration of an electronic device according to a fourth embodiment of the present invention.
Figure 14:
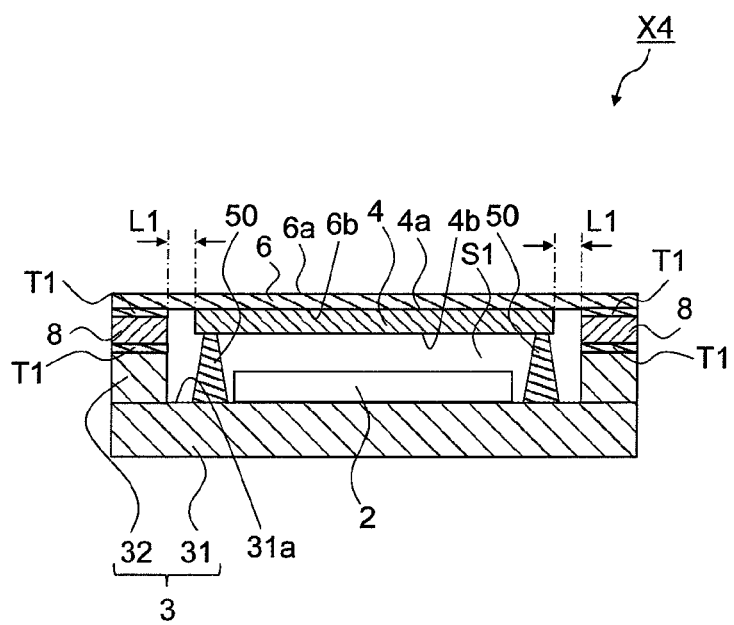
FIG. 14 is a cross-sectional view taken along a cutting-plane line IV-IV illustrated in FIG. 13.
Figure 15:
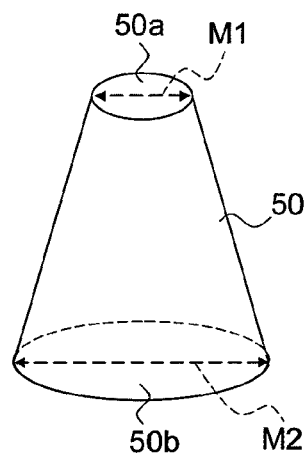
FIG. 15 is an enlarged view of a supporting body.

FIG. 13 is a plan view illustrating an overall configuration of an electronic equipment X4 according to the present embodiment. FIG. 14 is a cross-sectional view taken along a cutting-plane line IV-IV illustrated in FIG. 13. FIG. 15 is an enlarged view of a supporting body 50. In FIG. 13 and FIG. 14, components having the same functions as those illustrated in FIG. 1 and FIG. 3 are denoted by the same reference numerals, and the detailed explanation thereof will be omitted.

The electronic equipment X4 includes the supporting body 50 instead of the supporting body 5 explained in the first embodiment. In the fourth embodiment, the supporting body 50 is configured such that a diameter M1 of a surface 50a of the supporting body 50 that comes in contact with the back surface 4b of the touch panel 4 is smaller than a diameter M2 of a surface 50b of the supporting body 50 that comes in contact with the principal surface 31a of the base 31. Specifically, the supporting body 50 has a so-called tapered shape such that the diameter thereof gradually increases from the back surface 4b side of the touch panel 4 toward the principal surface 31a of the base 31. By configuring the supporting body 50 as described above, it is possible to reduce the degree of restraint to the touch panel 4 caused by the supporting body 50. Therefore, the electronic equipment X4 can adequately transmit tactile senses to a user.

Here, the term "diameter of surface" means the diameter of a circle for the case when the surface is circular in plan view. Also, the term "diameter of surface" means the diagonal of a polygon for the case when the surface is polygonal in plan view.

As described above, the electronic equipment X4 can adequately transmit tactile senses to a user while ensuring certain dustproof performance and waterproof performance.

Fifth Embodiment

Figure 16:
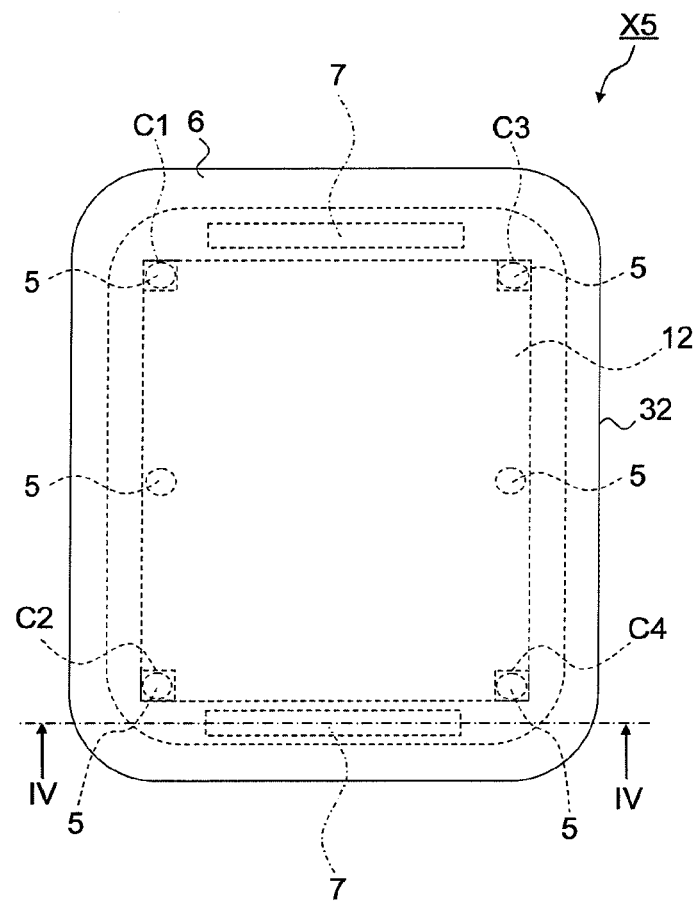
FIG. 16 is a plan view illustrating an overall configuration of an electronic device according to a fourth embodiment of the present invention.
Figure 17:
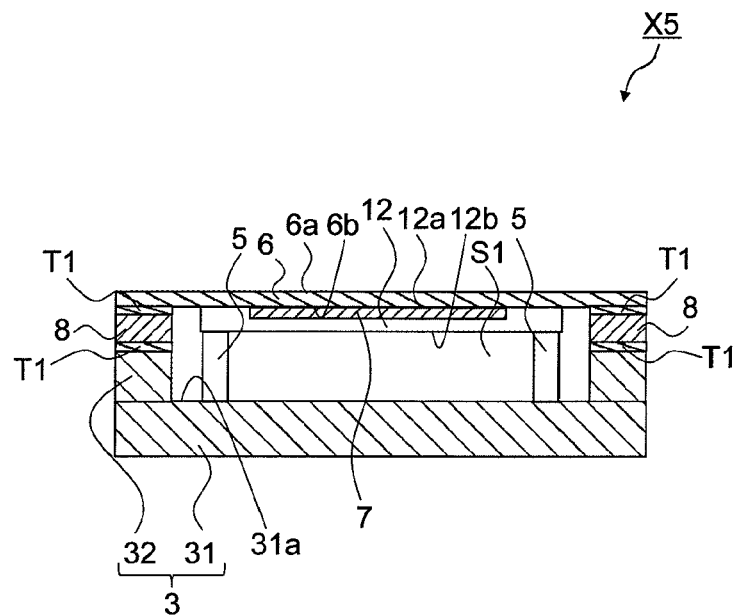
FIG. 17 is a cross-sectional view taken along a cutting-plane line V-V illustrated in FIG. 16.

FIG. 16 is a plan view illustrating an overall configuration of an electronic equipment X5 according to the present embodiment. FIG. 17 is a cross-sectional view taken along a cutting-plane line V-V illustrated in FIG. 16. In FIG. 16 and FIG. 17, components having the same functions as those illustrated in FIG. 1 and FIG. 3 are denoted by the same reference numerals, and the detailed explanation thereof will be omitted.

The electronic equipment X5 includes a liquid crystal panel 12 having a function to detect an input position, instead of the liquid crystal panel 2 and the touch panel 4 explained in the first to the third embodiments. Specifically, the liquid crystal panel 12 is supported by the supporting body 5. The operation unit 6 is provided on a front surface 12a side of the liquid crystal panel 12.

The liquid crystal panel 12 includes one substrate; other substrate disposed opposite the one substrate; a liquid crystal layer interposed between the one substrate and the other substrate; a photodetector provided on the one substrate; a display member layer that is interposed between the one substrate and the other substrate and that contributes to displaying; and a backlight that irradiates the one substrate and the other substrate with light.

The function of the liquid crystal panel 12 to detect an input position will be explained below. Specifically, when a finger is placed on the liquid crystal panel 12 via the operation unit 7 while external light is incident on the photodetector, external light that is incident on a portion of the photodetector corresponding to the finger is blocked. Therefore, the liquid crystal panel 12 can detect an input position by comparing a detection level of the photodetector on which external light is incident with a detection level of the photodetector on which external light is not incident.

An example has been explained above in which the liquid crystal panel 12 including a photodetector is employed as a liquid crystal panel that has a function to detect an input position; however, the present invention is not limited thereto. For example, it may be possible to employ a liquid crystal panel, in which a detection electrode of a capacitive touch panel is formed on a substrate on the liquid crystal panel side.

As described above, the electronic equipment X5 can adequately transmit tactile senses to a user while ensuring certain dustproof performance and waterproof performance. Furthermore, because the electronic equipment X5 includes the liquid crystal panel 12 having a function to detect an input position, it is not necessary to separately provide a touch panel, enabling to reduce the size of the electronic equipment X5.

Sixth Embodiment

Figure 18:
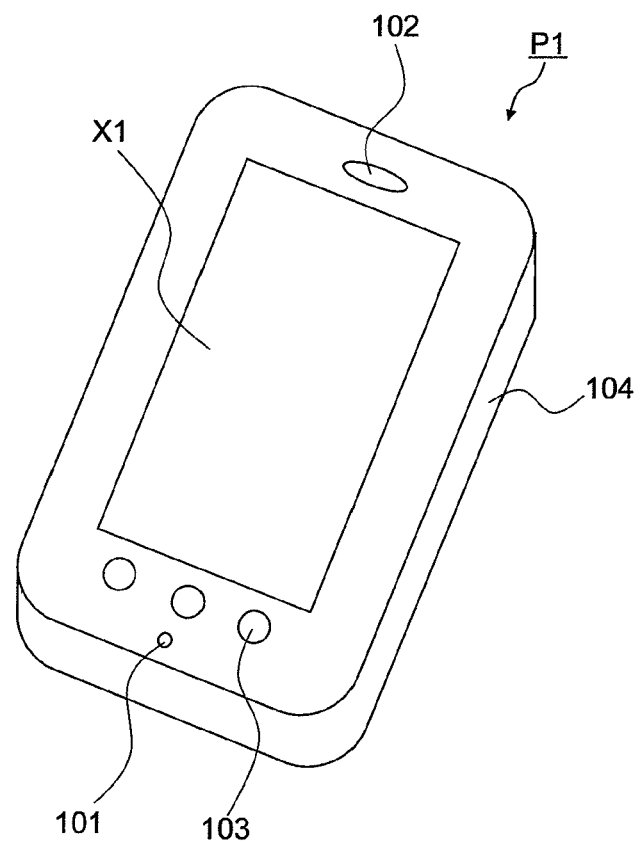
FIG. 18 is a perspective view illustrating an overall configuration of a handheld terminal.

FIG. 18 is a perspective view illustrating an overall configuration of a portable terminal P1 according to a sixth embodiment. As illustrated in FIG. 18, the portable terminal P1 is, for example, a terminal, such as a mobile phone, a smartphone, or a PDA, and includes the electronic equipment X1 explained in the first embodiment, a voice input unit 101, a voice output unit 102, a key input unit 103, and a second housing 104.

The voice input unit 101 is formed of, for example, a microphone, and receives voice of a user or the like. The voice output unit 102 is formed of a speaker or the like, and outputs voice of a counterpart or the like. The key input unit 103 is formed of, for example, a mechanical key. The key input unit 103 may be an operation key displayed on a display screen. The second housing 104 is a member that serves to house the electronic equipment X1, the voice input unit 101, the voice output unit 102, and the key input unit 103.

In addition, the portable terminal P1 may include a digital camera function unit, a tuner for one-segment broadcasting, a short-distance wireless communication unit, such as an infrared communication function unit, and various interfaces, depending on a required function. However, detailed illustration and explanation of the units are omitted.

The portable terminal P1 includes the electronic equipment X1; therefore, it is possible to adequately transmit tactile senses to a user while ensuring certain dustproof performance and waterproof performance.

An example has been explained above in which the portable terminal P1 includes the voice input unit 101; however, the present invention is not limited thereto. Specifically, the portable terminal P1 does not necessarily have to include the voice input unit 101.

Furthermore, while an example has been explained above in which the portable terminal P1 includes the electronic equipment X1, any of the electronic equipments X2 to X5 may be employed instead of the electronic equipment X1. Moreover, it may be possible to employ a portable terminal that includes any of the electronic equipments X2 to X5. The above embodiments may be combined as needed.

An example has been explained above in which the electronic equipments X1 to X5 are applied to the tactile transmission technique; however, the present invention is not limited thereto. The electronic equipment X1 to X5 may be applied to, for example, a technique for a panel speaker that outputs voice or a technique that enables listening to voice by bone conduction, in addition to the tactile transmission technique.

REFERENCE SIGNS LIST

X1 to X5 ELECTRONIC DEVICE
P1 PORTABLE TERMINAL
2 LIQUID CRYSTAL PANEL (DISPLAY PANEL)
3 FIRST HOUSING
31 BASE
32 FRAME BODY
32a to 32d CORNER PORTION OF FRAME BODY
4 TOUCH PANEL (DETECTING UNIT)
5, 50 SUPPORTING BODY
6 OPERATION UNIT
7 VIBRATING BODY
8, 80 FLEXIBLE PORTION
80a FIRST PART
80b SECOND PART
11 STOPPER
12 LIQUID CRYSTAL PANEL (DETECTING UNIT, DISPLAY PANEL)
104 SECOND HOUSING

What is claimed is:
1. An electronic device comprising:
a detecting unit that detects an input position;
a first housing including a base disposed opposite the detecting unit and a frame body positioned on the base so as to surround the detecting unit in plan view;
an operation unit positioned at a front surface side of the detecting unit so as to cover the detecting unit in plan view;
a vibrating body provided on a portion of a back surface of the operation unit, the portion being a region on which the detecting unit is not located, wherein the vibrating body and the detecting unit are separated by a gap; and
a flexible portion provided over a whole circumference of the frame body and supporting the operation unit.
2. The electronic device according to claim 1, wherein the detecting unit has an approximately rectangular shape in plan view, and the electronic device further comprises a supporting body provided on the base and supporting four corners portions of the detecting unit.

3. The electronic device according to claim 2, wherein a diameter of a surface of the supporting body in contact with the detecting unit is smaller than a diameter of a surface of the supporting body in contact with the base.

4. The electronic device according claim 1, wherein a gap is provided between the detecting unit and the flexible portion.

5. The electronic device according to claim 1, further comprising a stopper that prevents the operation unit from being detached from the frame body.

6. The electronic device according to claim 1, wherein
the detecting unit is a touch panel, and
the electronic device further comprises a display panel provided between the detecting unit and the base.

7. The electronic device according to any claim 1, wherein the detecting unit is a display panel having a function to detect an input position.

8. The electronic device according to claim 6, wherein the display panel is a liquid crystal panel or an organic EL panel.

9. A portable terminal comprising the electronic device according to claim 1 in a second housing.

10. The electronic device according to claim 7, wherein the display panel is a liquid crystal panel or an organic EL panel.

11. The electronic device according to claim 1, wherein the flexible portion is provided between the frame body and the operation unit.

12. The electronic device according to claim 1, wherein
the operation unit has an approximately rectangular shape in plan view,
the flexible portion includes:
first parts; and
second parts positioned at four corners of the frame body and each having a degree of flexure lower than a degree of flexure of the first parts, and
the first parts are located on regions except for the four corners of the frame body.

* * * * *